3,335,128
PREPARATION OF MIXED SALTS OF WATER-SOLUBLE CELLULOSE DERIVATIVES

Gordon D. Hiatt and Martin E. Rowley, Rochester, N.Y., assignors to Eastman Kodak Company, Rochester, N.Y., a corporation of New Jersey
No Drawing. Filed Sept. 11, 1961, Ser. No. 137,062
5 Claims. (Cl. 260—215)

This invention relates to mixed salts of cellulose sulfates, cellulose acylate sulfates and alkyl cellulose sulfates in which 10–60% of the cation is multivalent and the remainder is a monovalent substituent.

The manufacture of cellulose acetate sulfates and cellulose propionate sulfates is described in U.S. Patents Nos. 2,582,009 and 2,622,079 of Crane. These materials are ordinarily prepared in the form of their sodium salts. These products, however, differ generally from cellulose derivatives in that whereas with the usual line of cellulose derivatives it is possible to prepare both high and low viscosity products, in the case of the cellulose acetate sulfates and the like it is difficult to prepare products of high viscosity having uniformly good solubility in the form of their alkali metal salts in aqueous solvents. These materials being polymeric have been considered for uses to give body to preparations such as thickeners or the like, but because of their low-viscosity characteristics have not been considered useful in this connection.

One object of our invention is to provide water soluble cellulose sulfate, cellulose acylate sulfate or alkyl cellulose sulfate salts which exhibit high viscosity in aqueous solvents. Another object of our invention is to provide mixed salts of cellulose acetate sulfates and cellulose propionate sulfates having therein a certain proportion of multivalent cation to impart desirable properties thereto. Other objects of our invention will appear herein.

We have found that by preparing salts of cellulose sulfates, cellulose acylate sulfates and alkyl cellulose sulfates in which 10–60% of the cation is multivalent cation, the remainder being monovalent cation, that products are obtained having viscosities adapting those products to many uses for which they have not hitherto been thought useful. We have found that if a portion of the cation in the cellulose acetate sulfate or cellulose propionate sulfate salts is a multivalent cation such as calcium, magnesium or iron or of some other multivalent cation such as barium, lead, strontium or aluminum, the remainder of the cation being monovalent as sodium, potassium, lithium, ammonia, amine or the like, that a product is obtained which exhibits water solubility, but the flow of its solutions in water is sufficiently retarded that considerably higher viscosities result than have been obtained with water-soluble cellulose derivatives heretofore. For instance, 1% solutions in water of cellulose acetate sodium sulfate are readily flowable, whereas 1% solutions of mixed salts in accordance with our invention give solutions having flow times much more prolonged than with the sodium salts.

The salts in accordance with our invention are conveniently prepared by reacting upon cellulose material with a sulfating mixture composed of acetic anhydride, sodium sulfate, sulfuric acid, a substantial content of a salt of a multivalent cation, such as the acetate of one of the multivalent cations and possibly an esterification catalyst.

The following examples illustrate our invention:

Example 1

3.2 lbs. of cotton linters (containing 0.2 lb. of water) were presoaked for ½ hour at 110° F. in 6 lbs. of glacial acetic acid in a sigma bladed mixer. The inside temperature of the mixer was then lowered to 60° F. and while the mixer was being run a sulfating mixture was added at 50° F. The sulfating mixture added consisted of 10.5 lbs. of acetic anhydride, 3.5 lbs. of glacial acetic acid, 0.95 lb. of anhydrous sodium sulfate, 1 lb. of sulfuric acid and 0.25 lb. of calcium acetate monohydrate. Upon running the mixer the inside temperature was lowered to 55° F., whereupon esterification catalyst was added. The catalyst added consisted of 70 g. of sulfoacetic acid dissolved in 2 lbs. of a mixture of acetic acid and acetic anhydride (3:1). The inside temperature was allowed to rise to 60–62° F. at which point it was held until a water-soluble product was obtained. The catalyst was neutralized with 0.2 lb. of sodium acetate in 2 lbs. of acetic acid. Water was then stirred into the mass to form a uniform solution or dope and the product obtained was then precipitated by adding isopropanol to the mass. The product was separated from the liquid portion of the mass, washed with 85% isopropanol until free of acid and stabilized by the addition thereto of 90 g. of urea. A mixed sodium-calcium salt of cellulose acetate sulfate was obtained which analyzed as follows:

Apparent acetyl _____percent__ 20.7
Total sulfur _____do____ 7.89
Ratio of sodium to calcium _____ 8:6

The product obtained was found to give solutions in water having rates of flow considerably reduced (high viscosity) from those of water solutions of the sodium salts of cellulose acetate sulfate.

Example 2

Two samples of cellulose acetate (32% acetyl) were sulfated at different concentrations of calcium ion. In each case 40 g. of the dried cellulose acetate was dissolved in 200 g. of dimethylformamide and was cooled to 12° C. by placing in a constant temperature water bath. The sulfating mixtures were prepared by mixing 105 g. of acetic anhydride with 35 g. of acetic acid and 0.17 mole of sulfate but with varying ratios of sodium to calcium ion. The two sulfating formulas which were used were designated as A and B and were as follows:

|  | A g. | B g. |
| --- | --- | --- |
| Acetic anhydride | 105 | 105 |
| Acetic acid | 35 | 35 |
| Sodium sulfate | 9.7 | 5.9 |
| Sulfuric acid | 10 | 12.8 |
| Calcium acetate | 2.3 | 7.3 |

In both cases the sulfating mixtures were clear solutions which were first cooled before adding to the dissolved cellulose acetate. After the sulfating mixtures were added, stirring was continued for 10 minutes, after which time the esters formed were precipitated by pouring into isopropanol:methanol (2:1 by volume). The products were washed free of acids by use of an alcohol mixture as defined. Each was found to dissolve in water giving solutions having several times the viscosities of water solutions of cellulose acetate sodium sulfates. The two products analyzed as follows:

|  | A | B |
| --- | --- | --- |
| Percent of apparent acetyl | 21.0 | 22.8 |
| Percent of total sulfur | 6.06 | 5.92 |
| Intrinsic viscosity | 0.91 | 0.93 |
| Sodium to calcium ratio | 5:1 | 3:4 |

2% water solutions of the two esters showed the B sample to be more viscous and to become thixotropic at lower concentrations than the A sample.

The mixed salts in accordance with the invention give solutions in water at equivalent concentrations several times as viscous as those prepared from sodium salts of cellulose acetate sulfates and cellulose propionate sulfates which may even extend to being thixotropic in some cases. The sulfur contents of the products of our invention should be sufficient to give water solubilities. It may be stated as a general rule that the sulfur contents should be at least approximately 5%.

We claim:

1. A mixed salt of a sulfuric acid ester of cellulose having a sulfur content of at least about 5%, about 10–60% of said mixed salt contains multivalent salt forming cation and the remainder of said mixed salt contains monovalent cation.

2. A mixed sodium-calcium salt of a sulfuric acid ester of cellulose having a sulfur content of at least 5%, about 10–60% of said mixed salts contains calcium.

3. A water-soluble salt of cellulose acetate sulfate having at least about 5% sulfur, about 10–60% of said water-soluble salt being calcium and the remainder being monovalent cation.

4. A process for preparing a cellulose compound having high viscosity in aqueous solution which comprises reacting cellulose with an esterifying mixture containing acetic anhydride, sulfuric acid, sodium sulfate, calcium acetate in the presence of sulfoacetate acid esterification catalyst.

5. The sodium-calcium salt of cellulose acetate sulfate having at least 5% sulfur, about 10–60% of the said salt of cellulose acetate being calcium.

References Cited

UNITED STATES PATENTS

| | | | |
|---|---|---|---|
| 2,772,175 | 11/1956 | Beatty | 106—26 |
| 2,862,922 | 12/1958 | Sparrow et al. | 260—215 |
| 2,914,444 | 11/1959 | Smith | 260—215 |
| 3,000,876 | 9/1961 | Touey | 260—215 |

OTHER REFERENCES

Evans et al.: Bound Metal in Ethyl Cellulose Effect on Dilute Solution Properties, J.A.C.S., vol. 72, pp. 4750 to 4756 (October 1950).

DONALD E. CZAJA, *Primary Examiner.*

ABRAHAM H. WINKELSTEIN, WILLIAM H. SHORT, LEON J. BERCOVITZ, *Examiners.*

R. SAULL, E. C. EDWARDS, R. W. MULCAHY,
*Assistant Examiners.*